T. FARMER, Jr.
GEAR INDICATOR.
APPLICATION FILED MAY 24, 1919.
1,417,048.
Patented May 23, 1922.
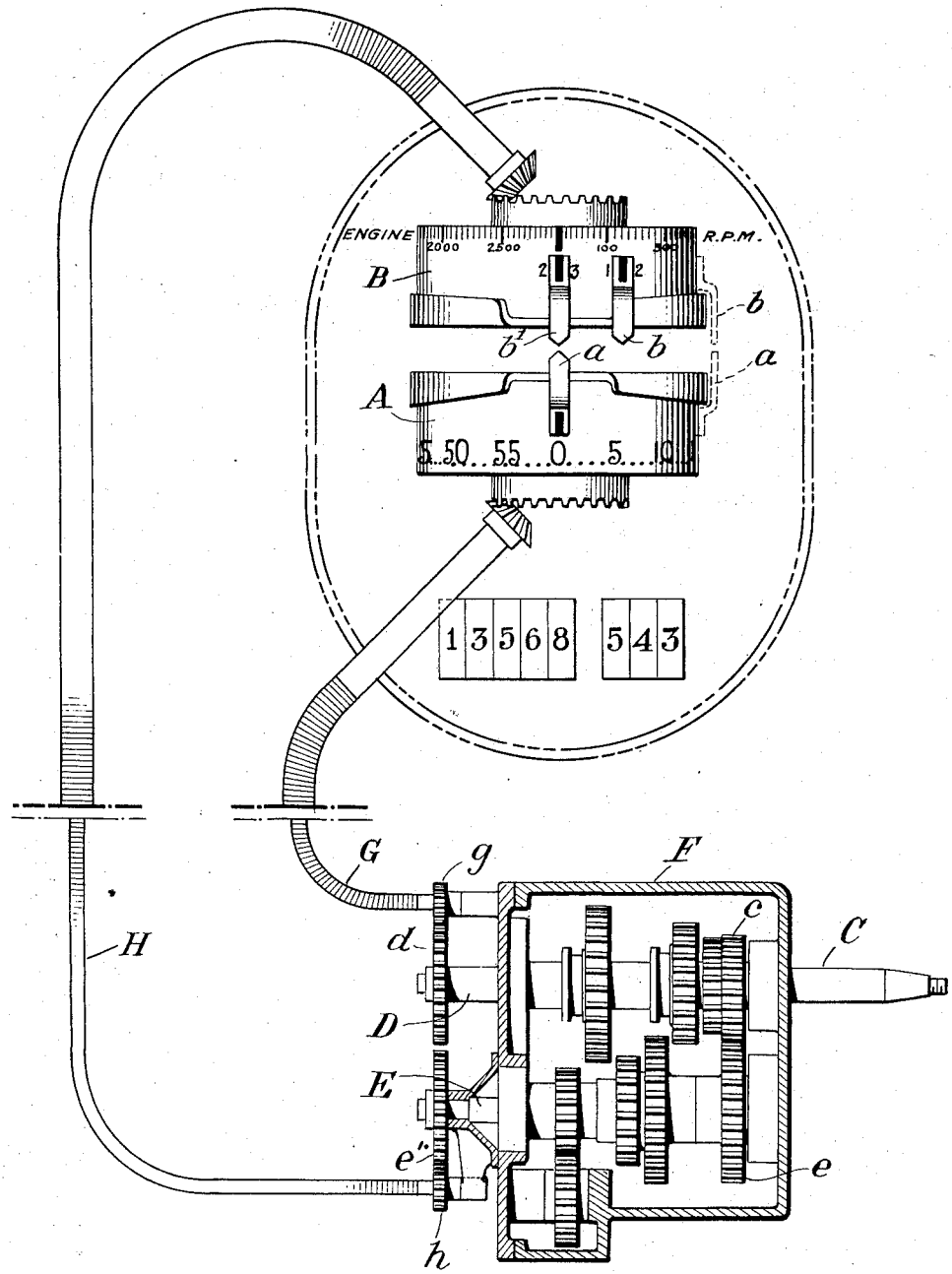
Thomas Farmer Jr. Inventor
By his Attorney
E. M. Bentley

UNITED STATES PATENT OFFICE.

THOMAS FARMER, JR., OF NEW YORK, N. Y.

GEAR INDICATOR.

1,417,048.　　　　　Specification of Letters Patent.　　Patented May 23, 1922.

Application filed May 24, 1919. Serial No. 299,581.

*To all whom it may concern:*

Be it known that I, THOMAS FARMER, Jr., a citizen of the United States, residing at New York city, borough of Manhattan, in the county of New York and State of New York, have invented certain new and useful Improvements in Gear Indicators, the following being a full, clear, and exact disclosure of the one form of my invention which I at present deem preferable.

For a detailed description of the present form of my invention, reference may be had to the following specification and to the accompanying drawing forming a part thereof, wherein I show that:

My invention resides in an indicator for the transmission gears of an automobile which will show the driver when the gears to be engaged are running at the same speed and can be thrown into mesh without clashing.

In the usual transmission the gears to be engaged are mounted on two shafts, to-wit, the jack-shaft which is driven constantly by the clutch-shaft at a definite gear ratio, and the propeller-shaft which is driven by the jack-shaft at different rates according to the particular set of gears which are engaged. The propeller-shaft is ordinarily connected with the speedometer in view of the driver to give him his rate of vehicle speed and I add to the speedometer a second indicator driven by the jack-shaft and I apply to it a mark or pointer corresponding to a similar mark or pointer which I add to the usual speed indicator. These marks or pointers are so located on the respective indicators that when certain disconnected gear teeth on the two shafts are turning at the same speed, the two marks or pointers will be in line with each other. The operator will thus know that when this occurs, the gears may be shifted without clashing, since the gears are then in synchronism.

In the drawing I have shown at F an ordinary transmission gearing wherein D is the propeller-shaft and E is the jack-shaft, the latter being constantly driven by the clutch-shaft C through gears $c$ and $e$. The clutch-shaft will be driven by the engine-shaft at engine-shaft speed when the clutch is in. A is the indicating member of a well known type of speedometer. This type of speedometer is one wherein there is a vibrating member, which by its position in its range of vibration, represents the rate of speed of the vehicle. For example, I would refer to the well-known instrument of this kind manufactured by the Waltham Watch Company, wherein the vibrating indicating member is a metallic ring dragged by an associated rotary ring, through the adhesive effect of an interposed air-film. The rotary member is usually driven by the propeller shaft, and the vibrating member is retracted by a spiral spring acting in opposition to the drag of the rotary member. It is not necessary to illustrate such a well-known piece of apparatus but it may be stated that such apparatus is based upon Tesla patent of December 12, 1916, No. 1,209,359. It is driven from the propeller-shaft D by a flexible shaft G and intermediate gear wheels $d$ and $g$, in the customary manner. Adjacent to said indicator A, I place a second indicator of the same construction operated in like manner by a flexible shaft H, which is, however, driven from jack-shaft E by gears $e^1$ and $h$. The two indicators are concentric and parallel so that their movements may be compared and the synchronism of gear teeth on their respective driving shafts noted. On the indicator B, I place a downward pointer $b$ and on indicator A an upward pointer $a$. These pointers are so located on their respective indicators that they will be in line with each other when the propeller-shaft, driven by the jack-shaft at the highest gearing ratio, attains such a speed that the next succeeding set of gears are rotating in synchronism. The driver will thereby know that he can make the shift to the next higher gear ratio—i. e. from lower to higher—without clashing of the gears. I also add to indicator B a second point $b^1$ which will come into line with pointer $a$ when the next shift, from "second" to "high" can be made without clashing of the interlocking teeth, it being remembered that the jack-shaft has always a definite gear relation to the clutch shaft and can therefore represent the speed of the clutch-shaft which, in this second shift, is to engage the propeller-shaft directly, propeller-shaft speed meaning vehicle speed.

It is now well understood that in the manipulation of such automobile gearing the clutch is first thrown out and the gears set at "neutral" before any shift to a new ratio is attempted. As a result of those preliminary steps, the jack-shaft (also the clutch-shaft permanently geared thereto) are set free, both from the engine-shaft on the one hand and the propeller-shaft on the other hand, and will slow down and ultimately come to rest if the free condition is maintained. Unless these two shafts are first set free there is danger of stripping off the gear teeth by the momentum of the engine and car when the shift is made. By setting them free the teeth encounter only the momentum of those comparatively light shafts, but by my invention even that is avoided. In going from a high to a lower ratio, the aforesaid slowing down of the free jack-shaft will be shown on indicator B and when that indicator registers with indicator A of the propeller-shaft (which has previously been running slower than the jack-shaft) the operator will know that two speeds are alike and that the shift can be made without clashing. In going, however, from a lower to a higher ratio the jack-shaft when set free as above described, will be running at a lower speed than the propeller-shaft. So, instead of waiting for the free jack-shaft to slow down to meet the propeller shaft speed, it has to be speeded up to meet it, and this is done in the usual way by momentarily throwing in the clutch. When the indicator B shows that the jack-shaft speed has thereby been raised sufficiently to meet the propeller-shaft speed, the clutch is again thrown out, and the shift is then made without clashing. This type of automobile gearing and its described mode of operation are now so well known that it is not considered necessary to illustrate herein the engine shaft and clutch.

Instead of the pointers I may use special marks on the two indicators which will show the points of alignment as the pointers do.

Moreover, since the jack-shaft has a fixed given ratio with respect to the clutch-shaft, that is driven directly by the engine whenever the clutch is in. I may use the indicator B to show the engine speed and, on the upper edge thereof, I show graduated marks representing such engine speed.

I intend my device to be used with all forms of speedometers, the one shown being merely for illustration of the principle. That principle may also be embodied in a variety of different ways. For example, the indicator B might be driven from the clutch-shaft instead of the jack-shaft, since the two shafts have a fixed relation to each other and both have the same changeable relation to the propeller-shaft.

While my device is intended primarily for automobiles and I have so described it, I also intend it for use with any gear-driven mechanism having different gear ratios with a shift from one to another.

What I claim as new and desire to secure by Letters Patent is:

1. An automobile gear indicator comprising two adjacent vibrating members, one representing by its position the speed of the propeller-shaft, the other representing by its position the speed of the clutch-shaft.

2. An automobile gear indicator comprising two adjacent vibrating members, one representing by its position the propeller-shaft speed, the other representing by its position the speed of an intermediate shaft having a definite gear relation to the clutch-shaft.

3. An automobile gear indicator having two adjacent indicating members, one representing by its position the propeller-shaft speed, the other representing by its position the clutch-shaft speed and so related as to show synchronism of the intermeshing gears which are about to be engaged.

4. An automobile gear indicator comprising speed-responsive vibrating members representing by their position the respective speeds of gears about to be engaged and so related as to show the synchronism of said gears.

5. An automobile gear indicator comprising two speed-responsive vibrating members, one representing the speed of a shaft having a definite speed ratio with respect to the clutch-shaft but changeable speed ratio with respect to the propeller-shaft, and the other member representing the speed of said propeller-shaft, the members being so related as to show synchronism of gears that are about to be engaged.

6. An automobile gear indicator comprising two speed-responsive vibrating members in adjacent and parallel relation, one member representing vehicle speed, the other clutch speed and arranged to show synchronism of gearing interposed between the two shafts.

7. A gear indicator comprising two adjacent speed-responsive vibrating members, a flexible driving shaft for each member, two shafts provided with sets of gears having two different ratios and connected respectively to the said flexible shafts, the said members being so related as to show synchronism of a disconnected set of gears when the other set is connected.

8. An indicator of the character described comprising two vibrating driven members, and indicating devices connected with the respective members, said indicating devices having indicating elements positioned to register with each other when the two members are moving at the same speed.

9. A gear indicator of the character described comprising two contiguous indicating members, means for independently and variably vibrating said members, and indicating elements on said members positioned to register with each other when the respective actuating means are moving in synchronism.

Signed at New York city, N.Y., this 22nd day of May, 1919.

THOMAS FARMER, Jr.